(12) United States Patent
Tomita et al.

(10) Patent No.: US 10,144,324 B2
(45) Date of Patent: Dec. 4, 2018

(54) SEAT BACK STRUCTURE (71) Applicant: Mazda Motor Corporation, Aki-gun, Hiroshima (JP)

(72) Inventors: Toshihiko Tomita, Aki-gun (JP); Motoharu Sato, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 63 days.

(21) Appl. No.: 15/496,478

(22) Filed: Apr. 25, 2017

(65) Prior Publication Data
US 2017/0313223 A1 Nov. 2, 2017

(30) Foreign Application Priority Data

Apr. 28, 2016 (JP) ................... 2016-090058

(51) Int. Cl.
*B60N 2/64* (2006.01)
*B60N 2/68* (2006.01)
*B60N 2/809* (2018.01)

(52) U.S. Cl.
CPC .............. *B60N 2/64* (2013.01); *B60N 2/686* (2013.01); *B60N 2/809* (2018.02)

(58) Field of Classification Search
CPC .................. B60N 2/64; B60N 2/686
See application file for complete search history.

(56) References Cited

U.S. PATENT DOCUMENTS

| 2009/0058166 A1* | 3/2009 | Boes ..................... B60N 2/686 297/452.18 |
| 2011/0018329 A1* | 1/2011 | Galbreath ............. B60N 2/012 297/452.18 |
| 2011/0140480 A1* | 6/2011 | Nakamura ........... B60N 2/3013 296/187.05 |
| 2012/0200137 A1* | 8/2012 | Tosco ................... B23K 37/04 297/452.48 |
| 2012/0234455 A1* | 9/2012 | Nuyan .................. B60N 2/682 156/60 |
| 2015/0232010 A1* | 8/2015 | Sato ..................... B60N 2/688 297/452.18 |

(Continued)

FOREIGN PATENT DOCUMENTS

JP 2011105049 A 6/2011

*Primary Examiner* — Timothy J Brindley
(74) *Attorney, Agent, or Firm* — Alleman Hall Creasman & Tuttle LLP (57) ABSTRACT

A seat back structure includes a seat back panel, a cushion member disposed on a seating surface side of the seat back panel, and an intermediate member inserted into a space between the panel and the cushion member. The panel is comprised of a metal plate member and formed with an embossed portion protruding at the seating surface side, and a bead portion protruding at an opposite side from the embossed portion at a position surrounding the embossed portion. The intermediate member has a lower specific gravity than the cushion member and a higher hardness than the cushion member. The intermediate member is formed with a contacting portion contacting the embossed portion and a concaved portion denting toward the cushion member at a position corresponding to the bead portion. A space is formed between the concaved portion and the panel, at a position adjacent to the contacting portion.

12 Claims, 10 Drawing Sheets

(56) References Cited

U.S. PATENT DOCUMENTS

| | | | |
|---|---|---|---|
| 2015/0336489 A1* | 11/2015 | Kijima | B60N 2/686 297/188.01 |
| 2016/0288671 A1* | 10/2016 | Zimmerman, II | B60N 2/2209 |
| 2017/0113587 A1* | 4/2017 | Mochizuki | B60N 2/64 |
| 2017/0267128 A1* | 9/2017 | Tomita | B60N 2/206 |
| 2017/0267146 A1* | 9/2017 | Ferguson | A47C 5/12 |
| 2017/0283070 A1* | 10/2017 | Hall | B64D 11/0647 |
| 2017/0368975 A1* | 12/2017 | Miyawaki | B60N 2/682 |

\* cited by examiner

SEAT BACK STRUCTURE

BACKGROUND

The present invention relates to a seat back structure.

Seat backs of vehicles generally have a structure in which a cushion member is disposed on a seating surface side of a seat back panel made of metal. Since the seat back panel generally has quite a large area, it is comprised of a metal plate member to secure rigidity. However, the rigidity is insufficient with a simple plate member. JP2011-105049A discloses a seat back panel including a large number of V-shaped bead portions, which are formed vertically adjacent to each other in a seat back, in order to increase the rigidity of the seat back panel.

For a weight reduction of the seat back, an intermediate member is inserted into a space between a seat back panel and a cushion member is considered. For example, it is possible to reduce the weight, by using a member of which a specific gravity is lower than that of the cushion member and a hardness is higher than that of the cushion member to be the intermediate member, compared to a case where a cushion member forms the part corresponding to the intermediate member. Recently, a further reduction in weight is desired.

SUMMARY

The present invention is made in view of the above issues and aims to provide a seat back structure a seat back which is reduced in weight and comprised of a seat back panel, an intermediate member, and a cushion member, while securing the rigidity of the seat back.

According to one aspect of the present invention, a seat back structure is provided, which includes a seat back panel, a cushion member disposed on a seating surface side of the seat back panel, and an intermediate member inserted into a space between the seat back panel and the cushion member. The seat back panel is comprised of a metal plate member and formed with an embossed portion protruding at the seating surface side, and a bead portion protruding at an opposite side from the embossed portion at a position surrounding the embossed portion. The intermediate member has a lower specific gravity than the cushion member and a higher hardness than the cushion member. The intermediate member is formed with a contacting portion contacting the embossed portion and a concaved portion denting toward the cushion member at a position corresponding to the bead portion. A space is formed between the concaved portion and the seat back panel, at a position adjacent to the contacting portion.

According to the above structure, by forming the embossed portion and the bead portion surrounding the embossed portion, the seat back panel is significantly increased in rigidity and reduced in weight by being thinned accordingly. Especially since the embossed portion protrudes toward the direction opposite from the protruding direction of the bead portion, compared to a case where they protrude toward the same direction, the rigidity is increased even further. Moreover, by using the intermediate member and forming the space between the seat back panel and the intermediate member, a further reduction in weight is achieved.

The embossed portion may be formed at a position of the seat back panel corresponding to a headrest in vehicle width directions. In this case, when a seated passenger leans on the seat back panel, the weight of the passenger is firmly supported by the embossed portion of the seat back panel via the contacting portion of the intermediate member. Thereby a seated sensation is improved.

The embossed portion may include a plurality of embossed portions spaced apart from each other in vertical directions of the seat back, at the position corresponding to the headrest. This structure is suitable for improving the seated sensation more sufficiently.

The bead portion may have an annular shape extending continuously to surround the embossed portion. In this case, the rigidity of the seat back panel is increased even further.

The embossed portion may protrude more than the bead portion. This structure is suitable for, for example, easily forming a narrow bead portion.

DETAILED DESCRIPTION OF EMBODIMENT

Hereinafter, one embodiment of the present invention is described with reference to the accompanying drawings. First, a seat back panel is described in detail with reference to FIGS. 1 to 10, and then an intermediate member and a cushion member are described with reference to FIGS. 11 to 14.

Figure 1:
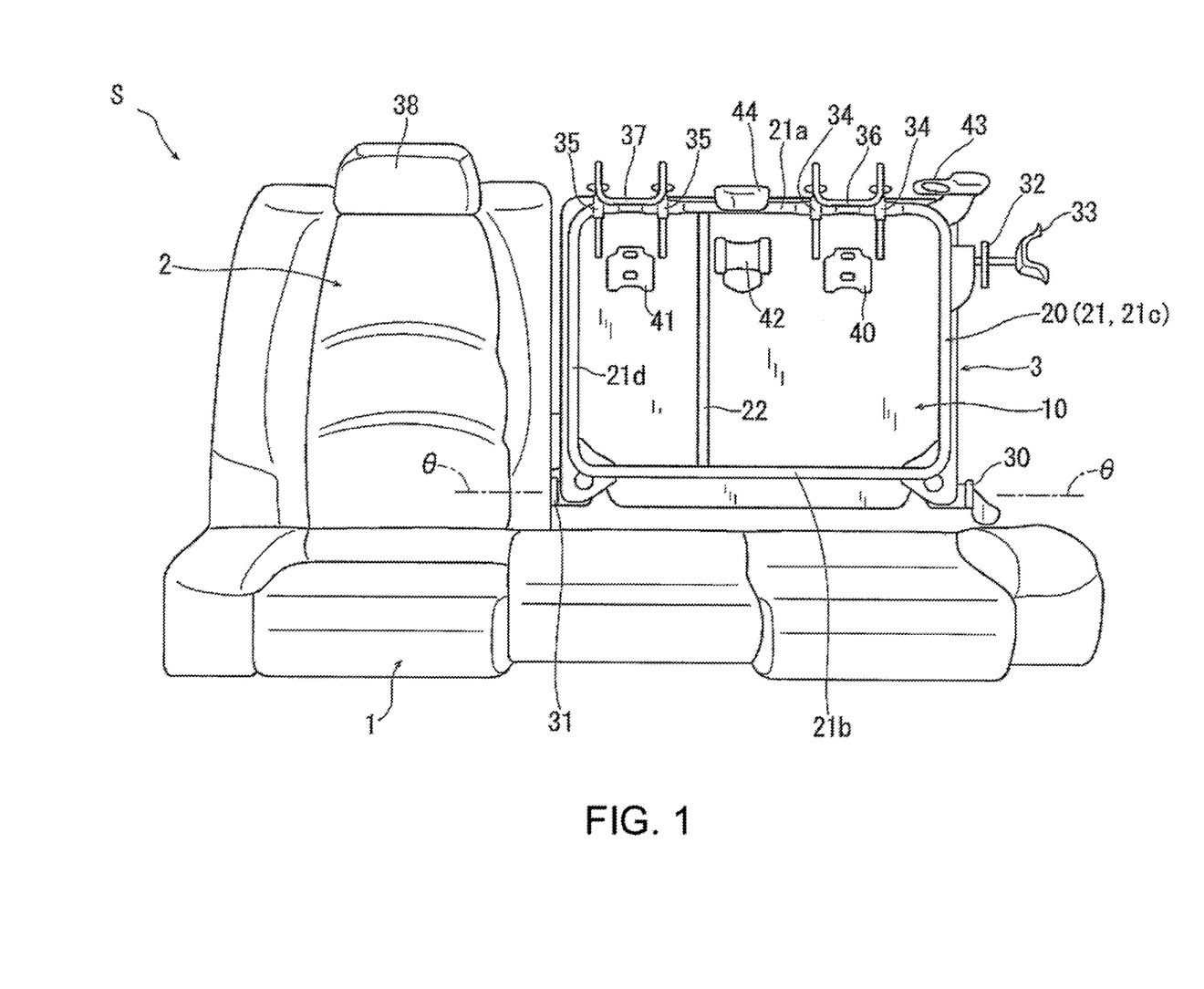
FIG. 1 is an elevational view illustrating one example of a rear seat to which the present invention is applied.

FIG. 1 illustrates a rear seat S of a vehicle, in which "1" indicates seat cushions, and "2" and "3" indicate left and right divided structures of a seat back (hereinafter, each of the divided structures is referred to as "the seat back"). The seat back 2 is applied for a single passenger and the seat back 3 is applied for two passengers. The seat back 3 is illustrated in a state where the cushion member, etc., are removed.

The seat back 3 has a seat back panel 10 and a frame 20. The seat back panel 10 is comprised of a metal plate member (in this embodiment, a regular flat steel plate) and, in FIG. 1, illustrated in a simplified state where bead portions, embossed portions (described later) etc. are omitted.

The frame 20 has a rectangular main frame 21 disposed along an outer circumferential edge of the seat back panel 10. For example, the main frame 21 has an upper part 21a extending in vehicle width (lateral) directions along an upper edge of the seat back panel 10, a lower part 21b extending laterally along a lower edge of the seat back panel 10, and a pair of left and right vertical parts 21c and 21d extending vertically along left and right edges of the seat back panel 10, respectively. The frame 20 also has an auxiliary frame 22 coupling the upper part 21a to the lower part 21b of the main frame 21. Such a frame 20 is comprised of one or more metal (in this embodiment, steel) pipe members and, for example, fixed at its four corners to the seat back panel 10 by welding.

The seat back 3 is coupled to the seat cushion 1 to be pivotable in front-and-rear directions of the seat back panel 10 (vehicle longitudinal directions) with respect to a pivot axis θ extending laterally, via brackets 30 and 31 provided in both lateral end parts of the main frame 21. In FIG. 1, the seat back 3 is illustrated at its upright position, and at this upright position, a first lock member 32 provided in an upper-left end part of the main frame 21 is locked to a second lock member 33 provided on the vehicle body side, thus, the upright position is maintained.

The seat back 3 is also capable of taking a folded position in addition to the upright position illustrated in FIG. 1. For example, at the upright position of FIG. 1, by releasing the first lock member 32 from the second lock member 33 and pivoting the seat back 3 forward by substantially 90 degrees, a surface facing backward (rearward) at the upright position faces upward to function as a loading surface where a load (baggage, goods, etc.) is placeable.

A pair of support tube parts 34 and a pair of support tube parts 35 are fixed (e.g., by welding) to the upper part 21a of the main frame 21. The two pairs of support tube parts 34 and 35 support headrest frames 36 and 37 to be vertically adjustable in position, respectively.

Similar to the seat back 3, the seat back 2 is capable of selectively taking the upright position and the folded position. Further similar to the seat back 3, the frame structure of the seat back 2 is comprised of a seat back panel and a frame. A headrest for the seat back 2 is denoted with the reference number "38."

In addition to the state of FIG. 1, where the seat backs 2 and 3 are at the upright position, a state where only the seat back 2 is at the folded position, a state where only the seat back 3 is at the folded position, and a state where both the seat backs 2 and 3 are at the folded position, are suitably selectable.

In FIG. 1, "40" and "41" indicate brackets for attaching child safety seats, "42" indicates a seat belt anchor, and "43" and "44" indicate seat belt guides. The brackets 40 and 41 and the seat belt anchor 42 are fixed to the seat back panel 10 by welding, for example. The seat belt guides 43 and 44 are fixed to the upper part 21a of the main frame 21.

Next, the seat back panel 10 is described in detail with reference to FIGS. 2 to 7. In this embodiment, the seat back panel 10 is formed by stamping a thin (in this embodiment, 0.4 mm) plain steel plate. The seat back panel 10 has flat surfaces that have large areas and extending vertically, in a center part and parts therearound which correspond to three sections R1 to R3 hatched in FIG. 5.

Figure 5:
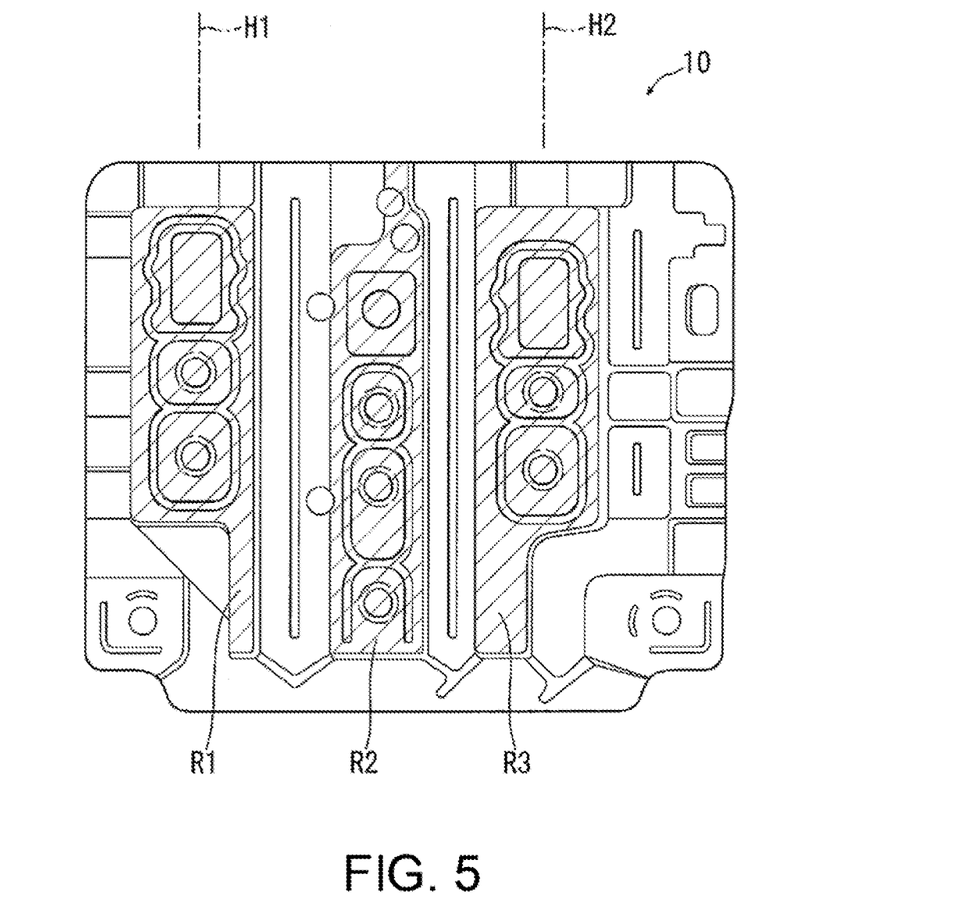
FIG. 5 is a view of the seat back panel illustrated in FIG. 2, hatched in flat surface portions that have large areas.
Figure 6:
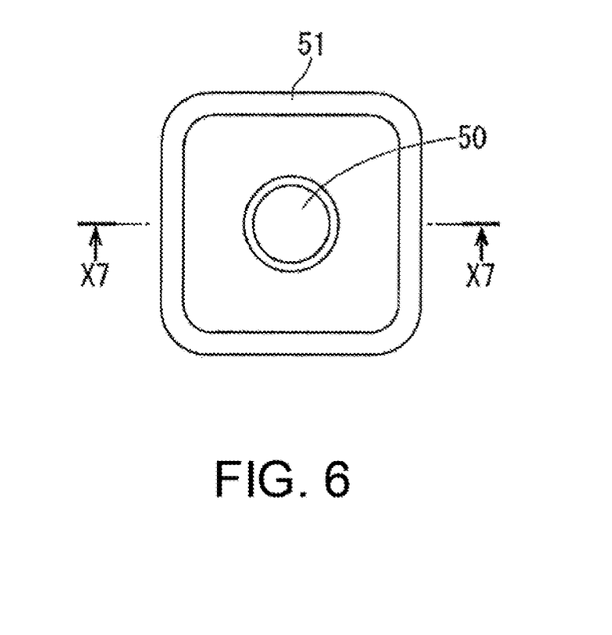
FIG. 6 is a view illustrating a pair of a bead portion and an embossed portion illustrated in FIG. 2.

The three sections R1 to R3 are sections where rigidities are particularly lower and reinforcements thereof are strongly desired. In this embodiment, the rigidities in the sections R1 to R3 are increased by forming the bead portions and the embossed portions. Hereinafter, a method of forming the embossed portions and the bead portions in the sections R1 to R3 is described, and positions and directions thereof are described based on the state where the seat back panel 10 is at the upright position (the state of FIG. 1).

First, in each of the sections R1 to R3, two or more circular embossed portions 50 are formed vertically in line and spaced apart from each other, parallel to the extending directions of each of the sections R1 to R3. The embossed portions 50 are formed by plastically deforming the sections so as to protrude at a seating surface side of the seat back panel 10 (the side facing forward at the upright position).

Two embossed portions 50 are formed in the section R1 in this embodiment, and the two embossed portions 50 are vertically spaced apart from each other, at a position indicated by the reference character "H1" in FIG. 5. The position of H1 is a lateral center position of the headrest frame 37. In other words, the embossed portions 50 of the section R1 is located so that when a passenger is seated corresponding to the headrest frame 37, the embossed portions 50 are on the back of the passenger.

Similarly, two embossed portions 50 are formed in the section R3 in this embodiment, and the two embossed portions 50 are vertically spaced apart from each other, at a position indicated by the reference character "H2" in FIG. 5. The position of H2 is a center position of the headrest frame 36 in the lateral directions. In other words, the embossed portions 50 of the section R3 is located so that when a passenger is seated corresponding to the headrest frame 36, the embossed portions 50 are on the back of the passenger.

Each bead portion 51 is formed to surround one embossed portion 50, has a rectangular shape (in this embodiment, substantially square), and is formed by plastically deforming the section so as to protrude at the rear side of the seat back panel 10 (the side facing rearward at the upright position). The bead portion 51 surrounding the embossed portion 50 is formed annularly and has a closed end.

In each of the sections R1 to R3, the bead portions 51 surrounding the plurality of embossed portions 50 are formed continuously to each other. For example, adjacent bead portions 51 in the vertical directions share portions (sides) thereof extending laterally. In other words, in each of the sections R1 to R3, a pair of left and right long bead portions (long portions) are formed to extend vertically and the pair of the left and right bead portions are coupled to each other by a short bead portion (short portion), so as to form a ladder structure as a whole. The embossed portions 50 are formed inside the sections surrounded by the upper, lower, left and right bead portions.

Figure 7:
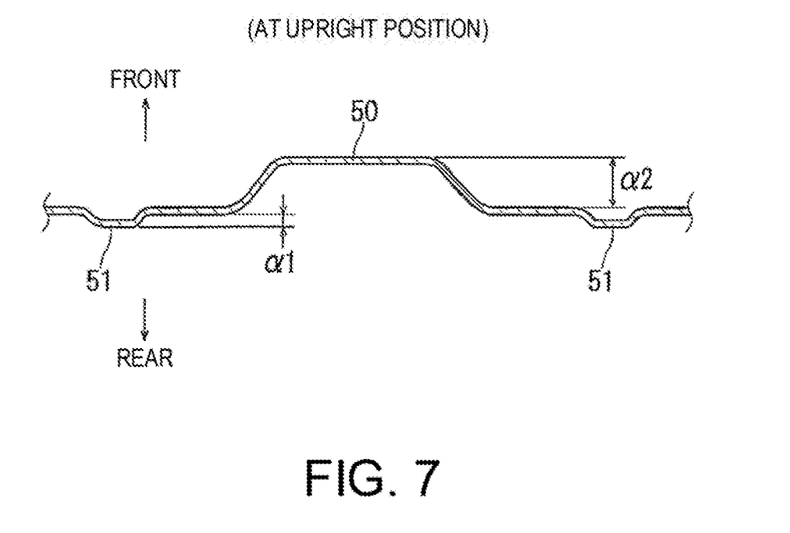
FIG. 7 is a cross-sectional view taken along a line X7-X7 of FIG. 6.

As illustrated in FIG. 7, the protrusion length of each bead portion 51 is indicated by the reference character "α1" and the protrusion length of each embossed portion 50 is indicated by the reference character "α2." Note that α2>α1. For example in this embodiment, α1 is set to about 2 to 3 mm and α2 is set to about 8 to 10 mm. Here, for the sake of convenience, although the embossed portion 50 and the bead portion 51 extend in the opposite directions from each other in the longitudinal directions (the embossed portion 50 extends toward the front side and the bead portion 51 extends toward the rear side), both of them are described as "protruding."

Even outside the sections R1 to R3, the seat back panel 10 is suitably formed with embossed portions 60 and bead portions 61 so that rigidity increases greatly as a whole. Note that the embossed portions 60 protrude at the front side of the seat back panel 10, and the bead portions 61 protrude at the rear side of the seat back panel 10. Further, the protrusion length of each embossed portion 60 is longer than that of each bead portion 61 (the same setting as the relationship between the embossed and bead portions 50 and 51).

Figure 2:
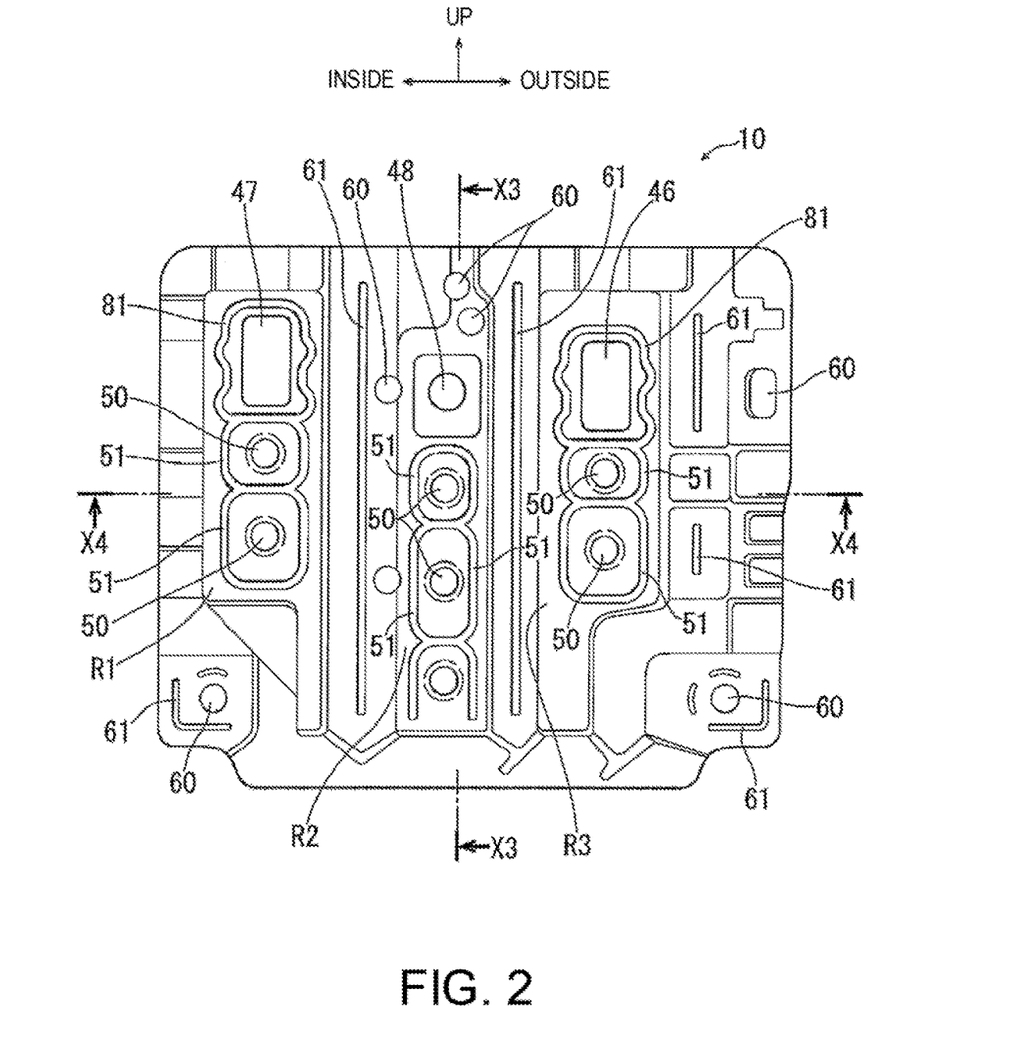
FIG. 2 is an elevational view of a seat back panel.
Figure 3:
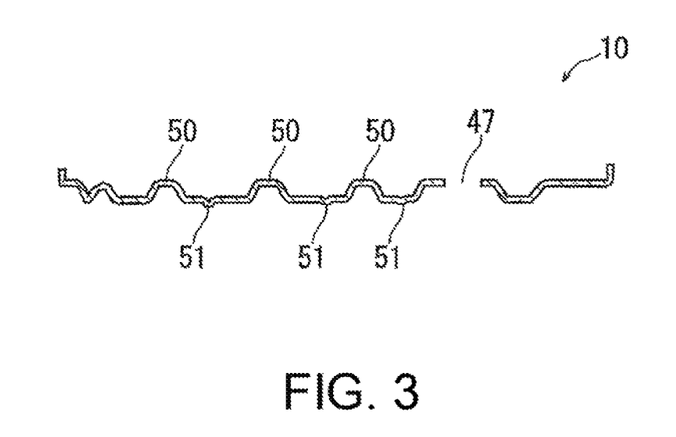
FIG. 3 is a cross-sectional view taken along a line X3-X3 of FIG. 2.
Figure 4:
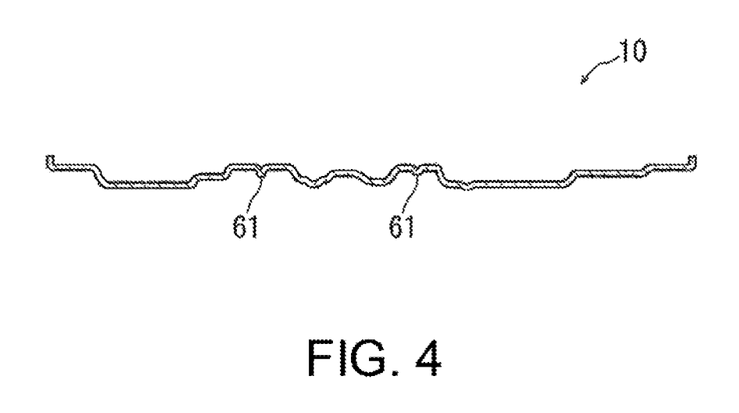
FIG. 4 is a cross-sectional view taken along a line X4-X4 of FIG. 2.

Note that in FIG. 2, "46" and "47" indicate attachment holes to attach the child-safety-seat attachment brackets 40 and 41, respectively, and "48" indicates an attachment hole to attach the seat belt anchor 42. Note that a thick cushion member is disposed on the front side of the seat back panel 10 while the rear side of the seat back panel 10 is covered by a thin cover sheet, so that the seat back panel 10 and the frame 20 are not visible from the outside.

Moreover, bead portions 81 formed annularly to extend circumferentially continuously (have a closed end) are formed to surround the attachment holes 46 and 47, respectively. The bead portions 81 protrude toward the same direction as the bead portions 51. By forming the bead portions 81, the rigidity near the attachment holes 46 and 47 is increased. In this embodiment, the bead portions 51 partially constitute portions of the bead portions 81. However, the bead portions 51 and 81 may be formed independently from each other without sharing a portion. Moreover, the bead portion 51 may be referred to as a first bead portion and the bead portion 81 may be referred to as a second bead portion.

In this embodiment, a bead portion which corresponds to the bead portion 81 is not formed to surround the attachment hole 48 for the seat belt anchor; however, a bead portion may be formed annularly to extend circumferentially continuously (have a closed end) to surround the attachment hole 48.

Here, each rectangular bead portion 51 has two opposing sides extending laterally. The two sides of each bead portion 51 are arranged so as not to align with the two sides of the other bead portion 51 separately disposed laterally therefrom. Since each side of the bead portion 51 extending laterally is arranged so as not to align with the side of another bead portion 51 laterally adjacent thereto as described above, the torsional rigidity of the seat back panel 10 is particularly increased. Moreover, the embossed portions 50 formed in the sections surrounded by the bead portions 51, respectively, are also arranged so as not to laterally align with each other, thus the torsional rigidity is increased even more.

The seat back 2 for a single passenger in FIG. 1, similar to the seat back 3 for two passengers, is comprised of a seat back panel 10 and a frame 20, and flat surfaces thereof that have large areas are formed with the embossed portions 50 and 60 and the bead portions 51, 61 and 81 described above.

The seat back panel 10 structured as above is significantly increased in rigidity by having, in its flat surfaces which have the large areas, the embossed portions 50 and the bead portions 51 annularly surrounding the embossed portions 50. Especially since the embossed portions 50 protrude toward the direction opposite from the protruding direction of the bead portions 51, compared to a case where they protrude toward the same direction, the rigidity is increased even more. Further, since each bead portion 51 surrounding one embossed portion 50 is formed annularly and has the closed end, the rigidity is increased even further. Moreover, since the bead portions 51 for the plurality of embossed portions 50 are formed continuously to each other, compared to a case where the bead portion 51 for a certain one of the embossed portions 50 is separated from the bead portion 51 for a different embossed portion 50, the rigidity is increased more. Since each bead portion 51 is formed into a rectangle (particularly, substantially square), bending forces from various directions are advantageously resisted.

When the seat back 3 (or 2) is at the upright position, although the embossed portions 50 with the longer protrusion length are located on the front side of the seat back panel 10, since the cushion member is disposed on the front side of the seat back panel 10, no problem arises from this large protrusion. Further, when the seat back 3 (or 2) is at the folded position, since the protrusion length of the bead portions 51 located on the rear side of seat back panel 10 (i.e., the loading surface side where the load is placed) is short, no trouble is caused in placing the load.

To secure desirable (required) rigidity, at least 0.5 mm of thickness is conventionally required. However in this embodiment, equivalent rigidity is securable with 0.3 mm. Depending on the shape or number of the embossed portions 50, the bead portions 51 etc., and the material of the seat back panel 10 and the like, the thickness may even be thinner. Therefore, by stamping a plain steel plate with the thickness of 0.2 mm to 0.5 mm, the weight is reduced more sufficiently than the conventional structure, while securing the required rigidity.

Figure 8:
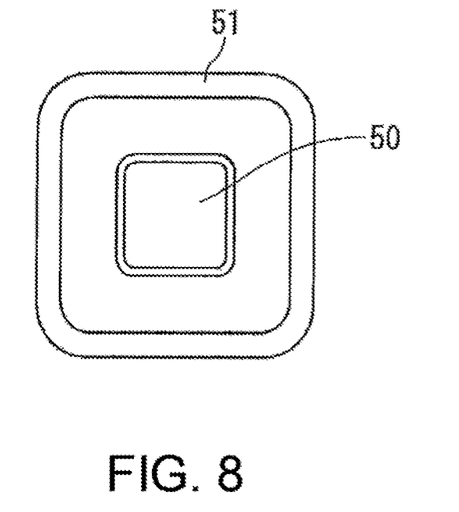
FIG. 8 is a view illustrating a second example of the pair of the bead portion and the embossed portion.
Figure 9:
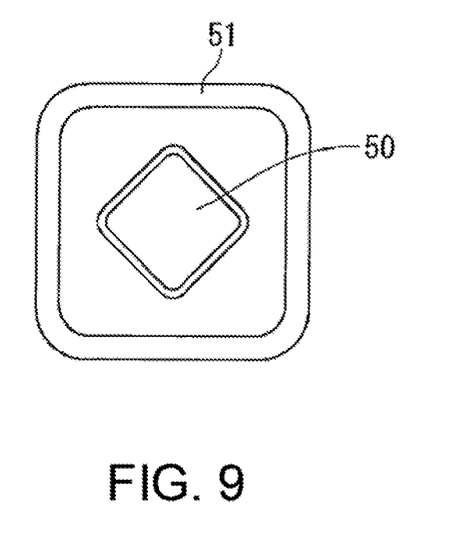
FIG. 9 is a view illustrating a third example of the pair of the bead portion and the embossed portion.
Figure 10:
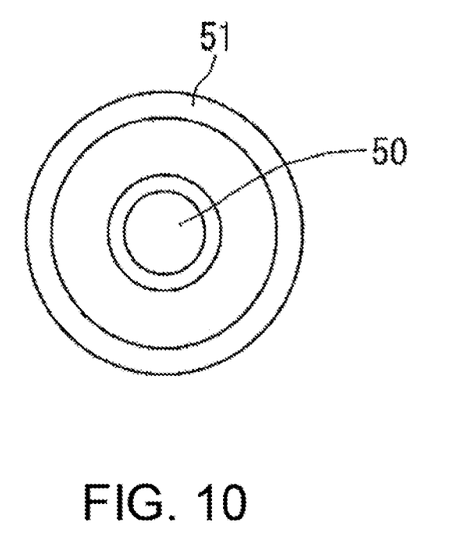
FIG. 10 is a view illustrating a fourth example of the pair of the bead portion and the embossed portion.

FIGS. 8 to 10 illustrate modifications of the embossed portion 50 and the bead portion 51, respectively. First, FIG. 8 illustrates an example in which the embossed portion 50 is formed into a rectangle (substantially square). In this example, each side of the embossed portion 50 extends in parallel to a corresponding side of the bead portion 51.

In the example of FIG. 9, similar to the case of FIG. 8, the embossed portion 50 is formed into a rectangle (substantially square), whereas the embossed portion 50 is arranged such that the respective sides thereof are inclined by substantially 45 degrees with respect to the sides of the bead portion 51. The case of FIG. 9 is suitable in coping with the bending forces applied from a wider range of directions.

FIG. 10 illustrates an example in which both of the embossed portion 50 and the bead portion 51 are formed into a circle. This case is also suitable in resisting external forces applied from various directions. As a modification of the case of FIG. 10, while the bead portion 51 is a circle, the embossed portion 50 may be a rectangle (particularly, substantially square).

Figure 11:
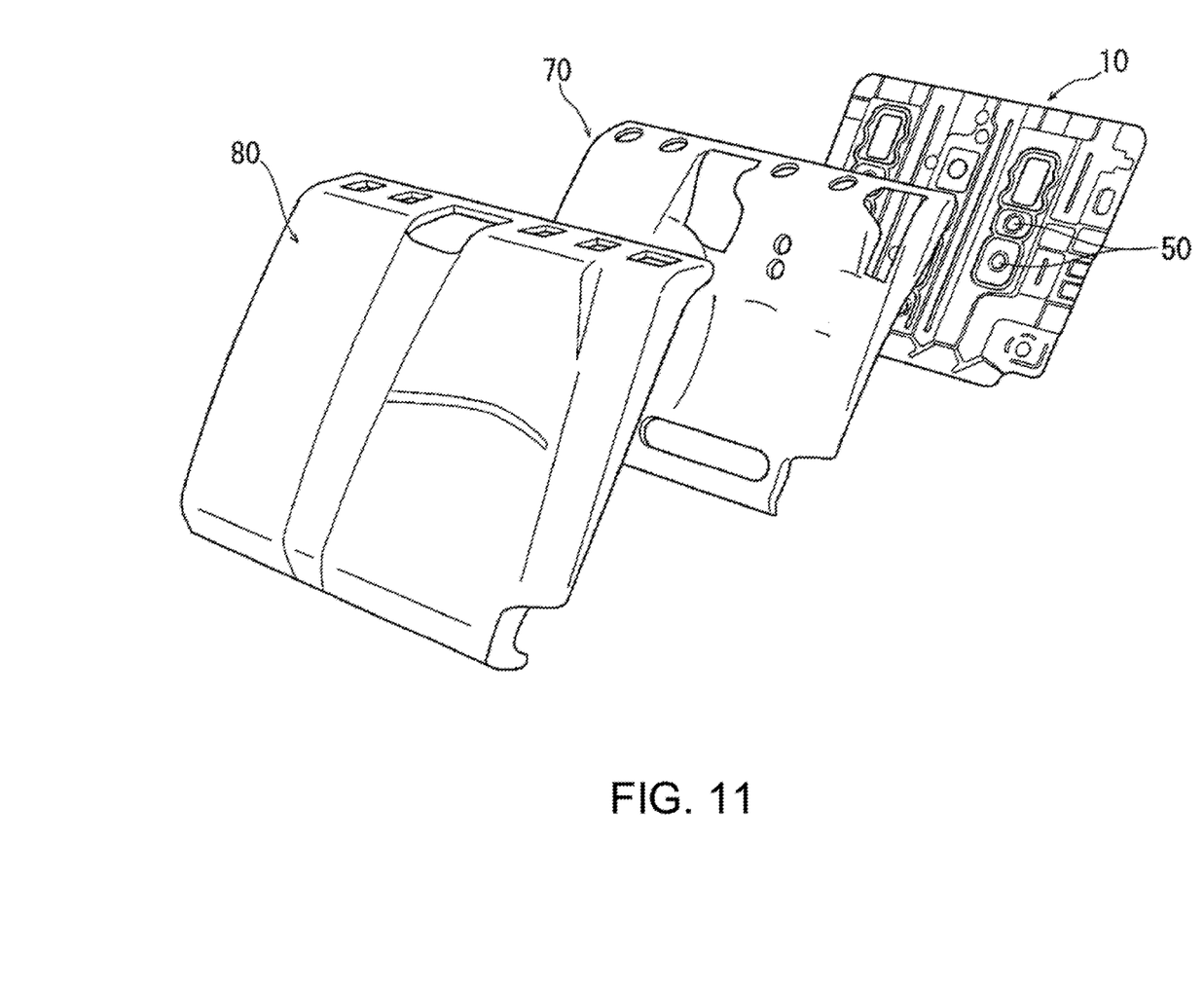
FIG. 11 is an exploded perspective view illustrating the seat back panel, an intermediate member, and a cushion member.

Next, the intermediate member and the cushion member attached to the seat back panel 10 are described with reference to FIGS. 11 to 14. As illustrated in FIG. 11, the cushion member 80 is for the passenger to directly contact with, is formed by covering urethane foam with an upholstery material, and thus has a sufficient cushioning characteristic. Due to the disposition of the intermediate member 70, the cushion member 80 is thinned by the thickness of the intermediate member 70.

The intermediate member 70 is disposed between the seat back panel 10 and the cushion member 80. The intermediate member 70 is formed by, for example, EPP (expanded polypropylene), and a specific gravity is set lower than that of the cushion member and the hardness is set higher than that of the cushion member. By providing such an intermediate member 70, compared to a case where the cushion member 80 forms the volume part corresponding to the intermediate member 70, the weight is reduced.

Figure 12:
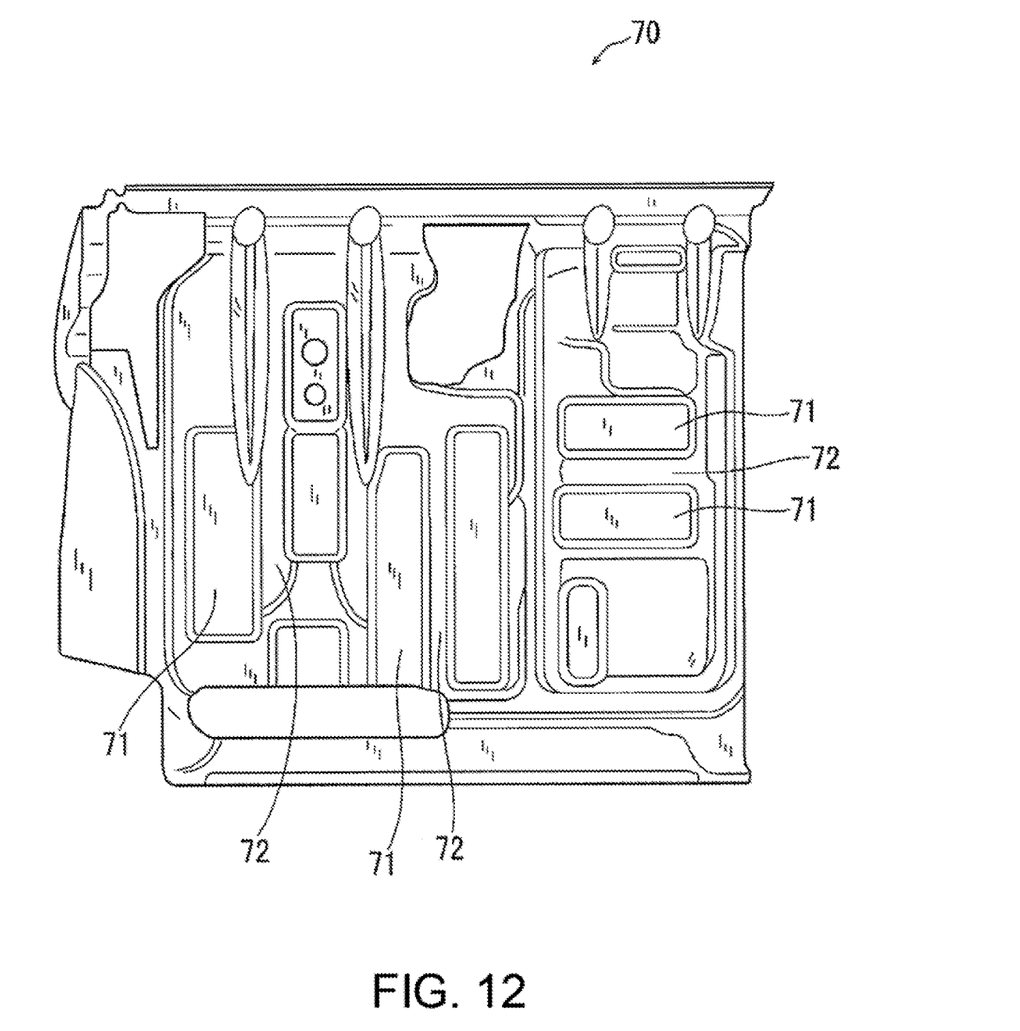
FIG. 12 is a view of the intermediate member seen from its rear side.
Figure 13:
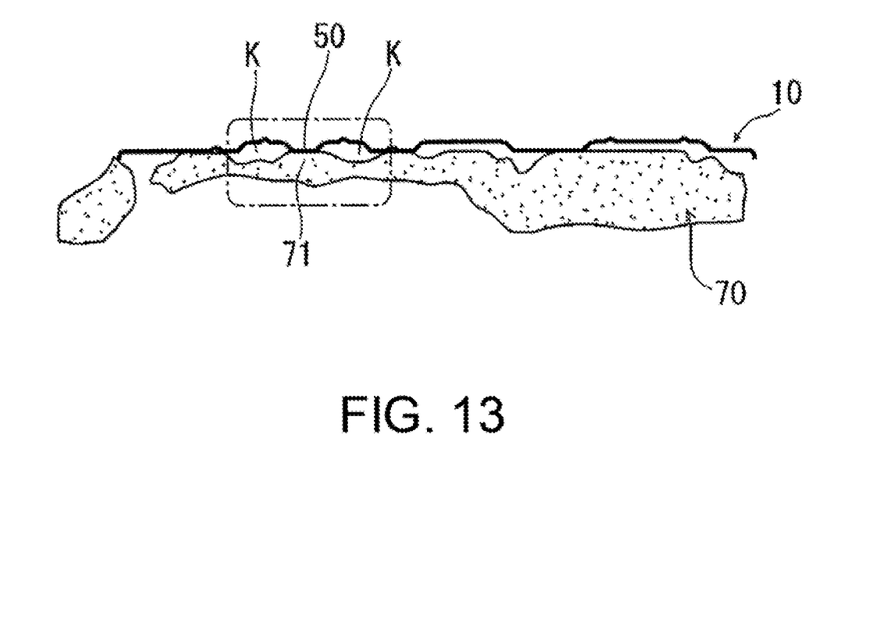
FIG. 13 is a cross-sectional view taken along the line X4-X4 of FIG. 2, illustrating a spatial relationship between the seat back panel and the intermediate member.
Figure 14:
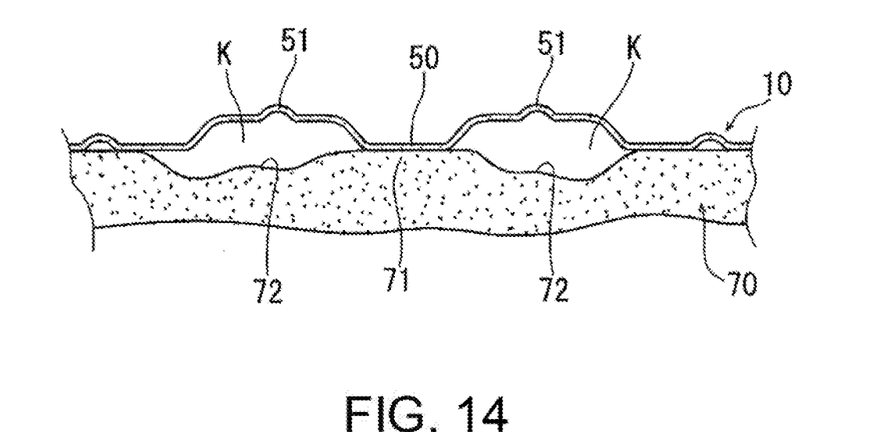
FIG. 14 is an enlarged cross-sectional view illustrating a section surrounded by a one-dotted chain line of FIG. 13.

The intermediate member 70 contacts (the seating surface side of) the seat back panel 10 with a suitable space therebetween. To describe this feature, first, the intermediate member 70 has contacting portions 71 in a back surface to contact the embossed portions 50 formed in the seat back panel 10. As illustrated in FIG. 12, in the sections R1 and R2 illustrated in FIG. 5, each contacting portion 71 is formed as a flat surface extending over two or more embossed portions 50, continuously in the vertical directions. In the section R3 illustrated in FIG. 5, the contacting portion 71 is formed as a flat surface independently provided for each embossed portion 50.

On the rear side of the intermediate member 70, a concaved portion 72 is formed to surround each contacting portion 71, specifically, the concaved portion 72 corresponds to the position of the closest bead portions 51 to the embossed portions 50 corresponding to the contacting portion 71. By forming the concaved portions 72, spaces K are formed between the seat back panel 10 and the intermediate member 70 (see FIGS. 13 and 14), at positions corresponding to the bead portions 51. The total area of all the spaces K occupies a significant part of the area of the intermediate member 70. Thus, compared to a case where the concaved portions 72 are not formed in the intermediate member 70 (a case where the intermediate member 70 is adhered to the seat back panel also at the positions corresponding to the spaces K), the intermediate member 70, i.e., the seat back S as a whole, is reduced in weight.

When a passenger leans on the seat back panel 10, the weight of the passenger is firmly supported by (the embossed portions 50 of) the seat back panel 10 via the contacting portions 71, and a good seated sensation is secured (improved).

As described above, with the combination of the weight reduction of the seat back panel 10 itself, the weight reduction by using the intermediate member 70, and also the weight reduction by forming the spaces K between the seat back panel 10 and the intermediate member 70 (lightening of the intermediate member 70), the overall sufficient weight reduction is achieved while securing the rigidity and the seated sensation.

Although the embodiment of the present invention is described above, the present invention is not limited to this, and suitable changes may be made within the range of the claims. The bead portion 51 surrounding the embossed portion 50 may extend circumferentially intermittently. The protrusion length of the bead portion 51 may be longer than that of the embossed portion 50. When a single embossed portion 50 and the bead portion 51 surrounding this embossed portion 50 are defined as a single cell unit, (bead portions 51 of) adjacent cells may be separated from each other without being disposed continuously.

When a single embossed portion 50 and the bead portion 51 surrounding this embossed portion 50 are defined as a single cell unit, since the effect of increasing the rigidity increases as the area of the single cell unit (the area surrounded by the bead portion 51) is smaller, it is suitable to set the area within a range of 100 square cm to 500 square cm. Further, it is suitable to set the area of the embossed portion 50 to about 10 to 30% of the area surrounded by the bead portion 51. The rigidity increasing part comprised of the single cell unit may suitably be disposed in the flat surface portions where the rigidity is particularly required in the seat back panel 10. For example, the disposition of the rigidity increasing part may suitably be selected from, for example, spreading the cell units per unit, disposing a plurality of cell units adjacently to each other, specifically in the case of disposing the plurality of cell units adjacently to each other, setting the extending direction thereof (arranged direction of the embossed portions 50) to be the lateral directions or inclined, etc. Note that the purpose of the present invention is not limited to that described explicitly, and it implicitly includes providing what is expressed as substantially suitable or advantageous.

The present invention is suitable in weight reduction of a seat back.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

S Seat
$\alpha 1$ Protrusion Length (Bead Portion)
$\alpha 2$ Protrusion Length (Embossed Portion)
R1 to R3 Section (Flat Surface Portion)
1 Seat Cushion
2 Seat Back (For One Passenger)
3 Seat Back (For Two Passengers)
10 Seat Back Panel
50 Embossed Portion
51 Bead Portion
70 Intermediate Member
71 Contacting Portion
72 Concaved Portion
80 Cushion Member
K Space

What is claimed is:

1. A seat back structure comprising:
   a seat back panel;
   a cushion member disposed on a seating surface side of the seat back panel; and
   an intermediate member inserted into a space between the seat back panel and the cushion member,
   the seat back panel being comprised of a metal plate member and formed with an embossed portion protruding at the seating surface side, and a bead portion protruding at an opposite side from the embossed portion at a position surrounding the embossed portion, the intermediate member having a lower specific gravity than the cushion member and a higher hardness than the cushion member, the intermediate member being formed with a contacting portion contacting the embossed portion and a concaved portion denting toward the cushion member at a position corresponding to the bead portion, and a space being formed between the concaved portion and the seat back panel, at a position adjacent to the contacting portion.

2. The seat back structure of claim 1, wherein the embossed portion is formed at a position of the seat back panel corresponding to a headrest in vehicle width directions.

3. The seat back structure of claim 2, wherein the bead portion has an annular shape extending continuously to surround the embossed portion.

4. The seat back structure of claim 3, wherein the embossed portion protrudes more than the bead portion.

5. The seat back structure of claim 2, wherein the embossed portion protrudes more than the bead portion.

6. The seat back structure of claim 2, wherein the embossed portion includes a plurality of embossed portions spaced apart from each other in vertical directions of the seat back, at the position corresponding to the headrest.

7. The seat back structure of claim 6, wherein the bead portion has an annular shape extending continuously to surround the embossed portion.

8. The seat back structure of claim 7, wherein the embossed portion protrudes more than the bead portion.

9. The seat back structure of claim 6, wherein the embossed portion protrudes more than the bead portion.

10. The seat back structure of claim 1, wherein the bead portion has an annular shape extending continuously to surround the embossed portion.

11. The seat back structure of claim 10, wherein the embossed portion protrudes more than the bead portion.

12. The seat back structure of claim 1, wherein the embossed portion protrudes more than the bead portion.

\* \* \* \* \*